A. V. B. ORR.
RECIPROCATING CHURN.
No. 185,403. Patented Dec. 19, 1876.
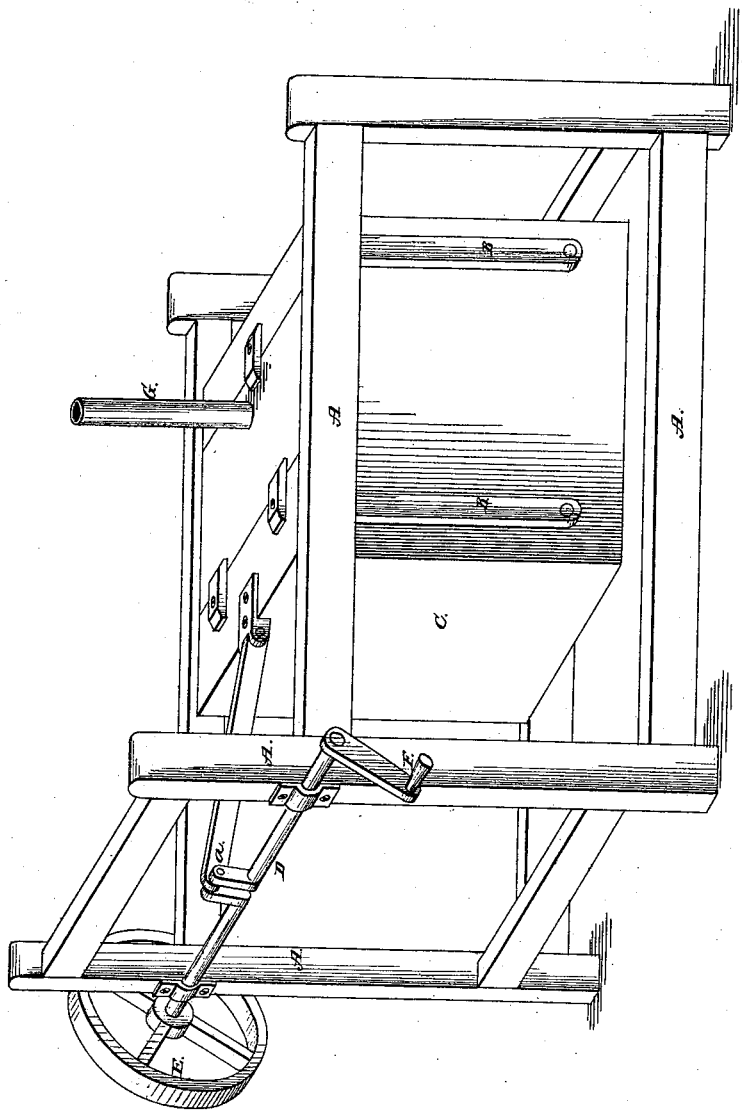

UNITED STATES PATENT OFFICE.

ADRIAN V. B. ORR, OF STEELEVILLE, PENNSYLVANIA.

IMPROVEMENT IN RECIPROCATING CHURNS.

Specification forming part of Letters Patent No. 185,403, dated December 19, 1876; application filed July 31, 1876.

*To all whom it may concern:*

Be it known that I, ADRIAN V. B. ORR, of Steeleville, Chester county, Pennsylvania, have invented a Reciprocating Butter-Churn, of which the following is a specification:

The object of my invention is to secure a proper ventilation in forcing the cream contained in the churn rapidly backward and forward through a perforated partition, so as to break the cream globules and liberate the butter, and then gather the butter into a compact mass.

A reference to the accompanying drawing, which is a perspective view of my invention, will illustrate my manner of accomplishing this object.

In a suitable frame, A A A A, constructed of either wood or iron, I suspend, by means of four movable arms, B B B B, a box, C, of any desired capacity, made water-tight, and having across its center a partition perforated by numerous holes for the passage of the cream as it is driven from side to side. In the lid of this box is placed a vent-pipe, G. This pipe is sufficiently large in the bore to prevent filling up when using thick cream; and to prevent the cream from splashing out when the box is in motion, a plug is placed in the top, through which passes a smaller hole than that of the pipe, thus securing vent, and at the same time preventing the waste of cream.

The arms B B B B, on which the box C is suspended, are placed two on either side of the box, and are attached at their upper ends to the frame A A by means of studs, on which they move freely, and at their lower ends, in the same manner, to the bottom of the box, permitting the box thus suspended to vibrate freely and easily in the frame.

The box C is put in motion by means of a crank-shaft, D, and pitman *a*. On one end of the crank-shaft is placed a balance-wheel, E, and on the other the handle F, or, if driven by power, a pulley.

From this description of my invention it will be seen that when this box is put in motion by the means described, the cream contained in it is forced at each vibration through the holes in the partition, thus breaking the cream globules and forming butter in much less time than is now done by any churn in common use, and realizing a larger quantity from the same qualities of cream.

I am aware that movable boxes, either with or without perforated partitions, have been used for the purpose of butter-making. My present invention differs from the rocking churn in this, that in that churn the only force given to the cream is that of its own gravitation, while in mine the force is derived from the rapid vibration of the box, and is, of course, much greater and more effectual in producing the result. The box moves smoothly in an arc, and is nearly as easily moved when full as when empty.

I wish it to be understood that I make no claim to the box separate from my combination in using it; but What I do claim as my invention, and wish to secure by Letters Patent, is—

The movable arms suspending a reciprocating box, having the vent-pipe G contracted at its upper and outer orifice, substantially as and for the purpose specified.

ADRIAN V. B. ORR.

Witnesses:
JOSEPH M. JONES,
J. M. ORR.